United States Patent
Sweet, III

(10) Patent No.: US 10,133,950 B2
(45) Date of Patent: Nov. 20, 2018

(54) DYNAMIC TEMPLATE TRACKING

(75) Inventor: Charles Wheeler Sweet, III, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 630 days.

(21) Appl. No.: 13/310,529

(22) Filed: Dec. 2, 2011

(65) Prior Publication Data

US 2012/0224068 A1    Sep. 6, 2012

Related U.S. Application Data

(60) Provisional application No. 61/449,500, filed on Mar. 4, 2011.

(51) Int. Cl.
| | |
|---|---|
| *H04N 5/225* | (2006.01) |
| *G06K 9/32* | (2006.01) |
| *G06K 9/00* | (2006.01) |
| *G06K 9/20* | (2006.01) |
| *G06T 7/246* | (2017.01) |

(52) U.S. Cl.
CPC ............ *G06K 9/32* (2013.01); *G06K 9/00671* (2013.01); *G06K 9/2063* (2013.01); *G06T 7/248* (2017.01); *G06T 2207/10016* (2013.01)

(58) Field of Classification Search
CPC .................................................. G06T 7/2033
USPC ......................................................... 348/169
See application file for complete search history.

(56) References Cited

U.S. PATENT DOCUMENTS

| | | |
|---|---|---|
| 6,526,156 B1 | 2/2003 | Black et al. |
| 6,687,386 B1 | 2/2004 | Ito et al. |
| 2002/0191862 A1* | 12/2002 | Neumann ............. G06T 7/0046 382/284 |
| 2009/0028440 A1 | 1/2009 | Elangovan et al. |
| 2009/0298517 A1 | 12/2009 | Freer |
| 2009/0322894 A1* | 12/2009 | Abe .................... G06K 9/00228 348/222.1 |
| 2010/0166261 A1 | 7/2010 | Tsuji |
| 2010/0197400 A1* | 8/2010 | Geiss .............................. 463/32 |
| 2010/0220891 A1 | 9/2010 | Lefevre et al. |

(Continued)

FOREIGN PATENT DOCUMENTS

| | | |
|---|---|---|
| CN | 101448142 A | 6/2009 |
| CN | 101465033 A | 6/2009 |
| JP | 2005182350 A | 7/2005 |

(Continued)

OTHER PUBLICATIONS

Herling et al., "An adaptive Training-free Feature Tracker on Mobile phones", Proceedings of the 17th ACM Symposium on Virtual Reality Software and Technology, Nov. 22, 2010, pp. 35-42, XP002668357.*

(Continued)

*Primary Examiner* — Jonathan R Messmore

(74) *Attorney, Agent, or Firm* — Kilpatrick Townsend & Stockton, LLP

(57) ABSTRACT

Various arrangements for tracking a target within a series of images is presented. The target may be detected within a first image at least partially based on a correspondence between the target and a stored reference template. A tracking template may be created for tracking the target using the first image. The target may be located within a second image using the tracking template.

43 Claims, 9 Drawing Sheets

(56) References Cited

U.S. PATENT DOCUMENTS

2011/0102605 A1    5/2011  Hannaford
2012/0105599 A1*   5/2012  Lin .................. G06T 5/006
                                                          348/50

FOREIGN PATENT DOCUMENTS

| JP | 2006507722 A | 3/2006 |
| WO | 2004038657 A2 | 5/2004 |
| WO | WO-2008107553 | 9/2008 |

OTHER PUBLICATIONS

Tsai et al., "Rate-efficient, real-time cd cover recognition on a camera-phone", Proceedings of the 16$^{th}$ SCM international conference on Multimedia, Nov. 26, 2008, pp. 1023-1024, XP002677213, ISBN: 978-1-60558-303-7.*

Chen et al., "Streaming mobile augmented reality on mobile phones", Proceedings of the 8th IEEE International Symposium on Mixed and Augmented Reality (ISMAR), Oct. 19, 2009, pp. 181-182, IEEE Computer Society, XP031568921, ISBN: 978-1-4244-5390-0.

Herling et al., "An Adaptive Training-free Feature Tracker for Mobile phones", Proceedings of the 17th ACM Symposium on Virtual Reality Software and Technology, Nov. 22, 2010, pp. 35-42, XP002668357.

International Search Report and Written Opinion—PCT/US2012/027426—ISA/EPO—dated Jun. 14, 2012.

Tsai et al., "Rate-efficient, real-time cd cover recognition on a camera-phone", Proceedings of the 16th ACM international conference on Multimedia, Nov. 26, 2008, pp. 1023-1024, XP002677213, ISBN: 978-1-60558-303-7, DOI: 10.1145/1459359.1459561, Retrieved from the Internet: URL:http://dl.acm.org/citation.cfm?id=1459561 [retrieved on Jun. 5, 2012].

Wagner et al., "Pose tracking from natural features on mobile phones", 7th IEEE/ACM International Symposium on Mixed and Augmented Reality (ISMAR), Sep. 15, 2008, pp. 125-134, IEEE, XP031343987, ISBN: 978-1-4244-2840-3.

\* cited by examiner

DYNAMIC TEMPLATE TRACKING

CROSS REFERENCES

This application claims priority to U.S. Provisional Application No. 61/449,500, filed Mar. 4, 2011, entitled "Dynamic Template Tracking". This application is incorporated by reference in its entirety for all purposes.

BACKGROUND

Detection and tracking of a target within a set of images may be useful for various purposes, such as augmented reality. For example, detecting and tracking a target may be used to augment a real-world situation with additional information. Images captured by an image capture device may be augmented with information that provides a user with additional sensory input, such as graphics or sound related to entities in the field of view of the image capture device. Some forms of augmented reality involve a device having a camera being pointed at an entity that a user wishes to augment with additional sensory input. Performing this form of augmented reality can involve at least three stages: first, detecting the entity within an image; second, tracking the entity in subsequent images; and third, augmenting the image with additional information. Following detecting the target within an image, tracking the target as its position shifts and/or the camera's perspective of the target changes in subsequent images may be unreliable and/or processor-intensive.

SUMMARY

Systems, methods, devices, computer programs, and apparatuses are described for tracking a target within a series of images. An example of method for tracking a target within a series of images may be presented. The method may include capturing, by a mobile device, a first image. Within the first image may be the target. The target may be an entity to be tracked. The method may include locating, by the mobile device, the target within a second image using a tracking template created using the first image.

Embodiments of such a method may include one or more of the following: The method may include creating, by the mobile device, the tracking template for tracking the target using the first image. The method may include transmitting, by the mobile device, at least a portion of the first image to a remote server. The method may include receiving, by the mobile device, the tracking template created using the first image from the remote server. The method may include detecting, by the mobile device, the target within the first image at least partially based on a correspondence between the target and a stored reference template. Detecting, by the mobile device, the target within the first image at least partially based on the correspondence between the target and the stored reference template may comprise: transmitting, by the mobile device, at least a portion of the first image to a remote server, and receiving, by the mobile device, the stored reference template from the remote server. Detecting, by the mobile device, the target within the first image at least partially based on the correspondence between the target and the stored reference template may comprise transmitting, by the mobile device, at least one descriptor based on the first image to a remote server, and receiving, by the mobile device, the stored reference template from the remote server. Detecting, by the mobile device, the target within the first image that corresponds to the stored reference template may comprise comparing, by the mobile device, at least one descriptor of the first image to at least one descriptor of the stored reference template. The method may include receiving, by the mobile device, at least partially based on detecting the target within the first image, data linked with the stored reference template.

Embodiments of such a method may also include one or more of the following: The method may include presenting, by the mobile device, user-discernable information at least partially based on at least a portion of the data linked with the stored reference template. Presenting, by the mobile device, user-discernable information at least partially based on at least the portion of the data linked with the stored reference template may comprise presenting the user-discernable information at least partially based on at least the portion of the data linked with the stored reference template concurrently with presenting the second image. Presenting, the user-discernable information at least partially based on at least the portion of the data linked with the stored reference template concurrently with presenting the second image may comprise: use of an augmented reality display, and a location of display of the at least the portion of the data linked with the stored reference template on the augmented reality display is affected by a location of the target in the second image. The method may include, following locating the target within the second image using the tracking template, locating, by the mobile device, the target within each image of additional images of the series of images using the tracking template. The method may include generating, by the mobile device, pose information using the first image, wherein the pose information represents a relationship between the stored reference template and the target. The method may include rectifying, by the mobile device, the first image using the pose information. The method may include cropping, by the mobile device, the first image to create the tracking template.

An example of a computer program residing on a non-transitory processor-readable medium may be presented. The computer program may comprise processor-readable instructions configured to cause a processor to cause a first image to be captured. Within the first image may be a target. The target may be an entity to be tracked. The processor-readable instructions may be configured to cause the processor to cause a second image to be captured. The processor-readable instructions may be configured to cause the processor to locate the target within the second image using a tracking template created using the first image.

Embodiments of such a computer program may include one or more of the following: The processor-readable instructions may be configured to cause the processor to create the tracking template for tracking the target using the first image. The processor-readable instructions may be configured to cause the processor to cause at least a portion of the first image to be transmitted to a remote server. The processor-readable instructions may be configured to cause the processor to receive the tracking template created using the first image from the remote server. The processor-readable instructions may be configured to cause the processor to detect the target within the first image at least partially based on a correspondence between the target and a stored reference template. The processor-readable instructions configured to cause the processor to detect the target within the first image at least partially based on the correspondence between the target and the stored reference template may comprise processor-readable instructions to: cause at least a portion of the first image to be transmitted to a remote server; and cause the stored reference template to be received from the remote server. The processor-readable instructions configured to cause the processor to detect the target within the first image at least partially based on the correspondence between the target and the stored reference template comprises processor-readable instructions to: cause at least one descriptor based on the first image to be transmitted to a remote server; and cause the stored reference template to be received from the remote server.

Embodiments of such a computer program may also include one or more of the following: The processor-readable instructions configured to cause the processor to detect the target within the first image that corresponds to the stored reference template comprise processor-readable instructions configured to cause the processor to compare at least one descriptor of the first image to at least one descriptor of the stored reference template. The processor-readable instructions may be configured to cause the processor to cause, at least partially based on detecting the target within the first image, data linked with the stored reference template to be received. The processor-readable instructions may be configured to cause the processor to cause user-discernable information at least partially based on at least a portion of the data to be presented. The processor-readable instructions configured to cause the processor to cause the user-discernable information at least partially based on at least the portion of the data to be presented may comprise processor-readable instructions configured to cause the processor to cause the user-discernable information at least partially based on at least the portion the data to be presented concurrently with the second image being presented. The processor-readable instructions configured to cause the processor to cause the user-discernable information at least partially based on at least the portion of the data to be presented concurrently with presenting the second image may further comprise processor-readable instructions configured to cause the processor to: use an augmented reality display; and adjust a location of display of the user-discernable information at least partially based on at least the portion of the data on the augmented reality display based on a location of the target in the second image. The processor-readable instructions may be configured to cause the processor to, following locating the target within the second image using the tracking template, locate the target within each image of a series of images using the tracking template. The processor-readable instructions may be configured to cause the processor to generate pose information using the first image, wherein the pose information represents a relationship between the stored reference template and the target. The processor-readable instructions may be configured to cause the processor to rectify the first image using the pose information, and crop the first image to create the tracking template.

An example of a device for tracking a target within a series of images may be presented. The device may include an image capture device. The device may include a processor. The device may include a memory communicatively coupled with and readable by the processor and having stored therein a series of processor-readable instructions which, when executed by the processor, cause the processor to cause a first image to be captured by the image capture device. Within the first image may be the target. The target may be an entity to be tracked. The processor-readable instructions, when executed by the processor, may be configured to cause a second image to be captured. The processor-readable instructions, when executed by the processor, may be configured to locate the target within the second image using a tracking template created using the first image.

Embodiments of such a method may include one or more of the following: The processor-readable instructions, when executed by the processor, may be configured to cause the processor to create the tracking template for tracking the target using the first image. The device may further comprise processor-readable instructions configured to cause the processor to cause at least a portion of the first image to be transmitted to a remote server; and receive the tracking template created using the first image from the remote server. The device may further comprise processor-readable instructions configured to cause the processor to detect the target within the first image at least partially based on a correspondence between the target and a stored reference template. The processor-readable instructions configured to cause the processor to detect the target within the first image that corresponds to the stored reference template may comprise processor-readable instructions configured to cause the processor to cause at least a portion of the first image to be transmitted to a remote server; and cause the stored reference template to be received from the remote server. The processor-readable instructions configured to cause the processor to detect the target within the first image that corresponds to the stored reference template may comprise processor-readable instructions configured to cause the processor to cause at least one descriptor based on the first image to be transmitted to a remote server; and cause the stored reference template to be received from the remote server. The processor-readable instructions configured to cause the processor to detect the target within the first image that corresponds to the stored reference template may comprise processor-readable instructions configured to cause the processor to: compare at least one descriptor of the first image to at least one descriptor of the stored reference template.

Embodiments of such a method may also include one or more of the following: The device may further comprise processor-readable instructions configured to cause the processor to cause, at least partially based on detecting the target within the first image, data linked with the stored reference template to be received, and cause user-discernable information at least partially based on at least a portion of the data to be presented. The processor-readable instructions configured to cause the processor to cause the user-discernable information at least partially based on at least the portion of the data to be presented may comprise processor-readable instructions configured to cause the processor to cause the user-discernable information at least partially based on at least the portion of the data to be presented concurrently with the second image being presented. The processor-readable instructions configured to cause the processor to cause the user-discernable information at least partially based on at least the portion of the data to be presented concurrently with presenting the second image may further comprise processor-readable instructions configured to cause the processor to: use an augmented reality display; and adjust a location of display of the at least the portion of the data on the augmented reality display based on a location of the target in the second image. The device may further comprise processor-readable instructions configured to cause the processor to, following locating the target within the second image captured by the image capture device using the tracking template, locate the target within each image of the series of images captured by the image capture device using the tracking template. The device may further comprise processor-readable instructions configured to cause the processor to generate pose information using the first image, wherein the pose information represents a relationship between the stored reference template and the target. The device may further comprise processor-readable instructions configured to cause the processor to rectify and crop the first image to create the tracking template. The device may be selected from a group consisting of: a cellular phone, a tablet computer, and a smartphone.

An example of an apparatus for tracking a target within a series of images may be presented. The apparatus may include means for capturing a first image. Within the first image may be the target. The target may be an entity to be tracked. The apparatus may include means for locating the target within a second image captured by the means for capturing the first image using a tracking template created using the first image.

Embodiments of such an apparatus may include one or more of the following: The apparatus may include means for creating the tracking template for tracking the target using the first image. The apparatus may include means for transmitting at least a portion of the first image to a remote server. The apparatus may include means for receiving the tracking template created using the first image from the remote server. The apparatus may include means for detecting the target within the first image at least partially based on a correspondence between the target and a stored reference template. The means for detecting the target within the first image that corresponds to the stored reference template may comprise: means for transmitting the first image to a remote server; and means for receiving the stored reference template. The means for detecting the target within the first image that corresponds to the stored reference template may comprise: means for transmitting at least one descriptor based on the first image to a remote server; and means for receiving the stored reference template. The means for detecting the target within the first image that corresponds to the stored reference template may comprise means for comparing at least one descriptor of the first image to at least one descriptor of the stored reference template. The apparatus may include means for receiving, at least partially based on detecting the target within the first image, data linked with the stored reference template. The apparatus may include means for presenting user-discernable information at least partially based on at least a portion of the data.

Embodiments of such an apparatus may also include one or more of the following: the means for presenting the user-discernable information at least partially based on at least the portion of the data may comprise means for presenting the user-discernable information at least partially based on at least the portion of the data concurrently with presenting the second image. The means for presenting user-discernable information at least partially based on at least the portion of the data concurrently with presenting the second image may comprise: means for using an augmented reality display; and means for adjusting a location of display of the at least the portion of the data on the augmented reality display at least partially based on a location of the target in the second image. The apparatus may include means for locating the target within each additional image of the series of images captured by the means for capturing the first image using the tracking template. The apparatus may include means for generating pose information using the first image, wherein the pose information represents a relationship between the stored reference template and the target. The apparatus may include means for rectifying the first image using the pose information. The apparatus may include means for cropping the first image to create the tracking template.

An example of a method for tracking a target within a series of images may be presented. The method may include receiving, by a computer system, a first image from a mobile device. Within the first image may be the target. The target may be an entity to be tracked. The method may include creating, by the computer system, a tracking template based on the first image, wherein the tracking template is used for tracking the target in the series of images by the mobile device. The method may include transmitting, by the computer system, the tracking template to the mobile device.

Embodiments of such a method may include one or more of the following: The method may include identifying, by the computer system, using the first image, a stored reference template that corresponds to the target. The method may include transmitting, by the computer system, the stored reference template to the mobile device. The method may include transmitting, by the computer system, data linked with the stored reference template to the mobile device. The method may include generating, by the computer system, pose information using the first image, wherein the pose information represents a relationship between the stored reference template and the target. Creating the tracking template may comprise rectifying, by the computer system, the first image using the pose information. Creating the tracking template further may comprises cropping, by the computer system, the rectified first image.

An example of a computer program residing on a non-transitory processor-readable medium may be presented. The computer program may comprise processor-readable instructions configured to cause a processor to receive a first image from a mobile device. The first image may be a target. The target may be an entity to be tracked. The processor-readable instructions may be configured to cause the processor to create a tracking template based on the first image, wherein the tracking template is used for tracking the target in a series of images by the mobile device. The processor-readable instructions may be configured to cause the processor to cause the tracking template to be transmitted to the mobile device.

Embodiments of such a computer program may include one or more of the following: The processor-readable instructions may be configured to cause the processor to identify, using the first image, a stored reference template that corresponds to the target. The processor-readable instructions may be configured to cause the processor to cause the stored reference template to be transmitted to the mobile device. The processor-readable instructions may be configured to cause the processor to cause data linked with the stored reference template to be transmitted to the mobile device. The processor-readable instructions may be configured to cause the processor to generate pose information using the first image, wherein the pose information represents a relationship between the stored reference template and the target. The processor-readable instructions configured to cause the processor to create the tracking template based on the first image may comprise processor-readable instructions configured to rectify the first image using the pose information. The processor-readable instructions configured to cause the processor to create the tracking template based on the first image may comprise processor-readable instructions configured to crop the rectified first image.

An example of a device for tracking a target within a series of images may be presented. The device may include a processor. The device may include a memory communicatively coupled with and readable by the processor and having stored therein a series of processor-readable instructions which, when executed by the processor, cause the processor to receive a first image from a mobile device. Within the first image may be the target. The target may be an entity to be tracked. The processor-readable instructions may be further configured to cause the processor to create a tracking template based on the first image, wherein the tracking template is used for tracking the target in the series of images by the mobile device. The processor-readable instructions may be further configured to cause the processor to cause the tracking template to be transmitted to the mobile device.

Embodiments of such a device may include one or more of the following: The series of processor-readable instructions may further comprise processor-readable instructions configured to cause the processor to identify, using the first image, a stored reference template that corresponds to the target. The series of processor-readable instructions may further comprising processor-readable instructions configured to cause the processor to cause the stored reference template to be transmitted to the mobile device. The series of processor-readable instructions further comprise processor-readable instructions configured to cause the processor to cause data linked with the stored reference template to be transmitted to the mobile device. The series of processor-readable instructions may further comprise processor-readable instructions configured to cause the processor to generate pose information using the first image, wherein the pose information represents a relationship between the stored reference template and the target. The processor-readable instructions configured to cause the processor to create the tracking template based on the first image may comprise processor-readable instructions configured to rectify the first image using the pose information. The processor-readable instructions configured to cause the processor to create the tracking template based on the first image may comprise processor-readable instructions configured to crop the rectified first image.

An example of an apparatus for tracking a target within a series of images may be presented. The apparatus may include means for receiving a first image from a mobile device. Within the first image may be the target. The target may be an entity to be tracked. The apparatus may include means for creating a tracking template based on the first image, wherein the tracking template is used for tracking the target in the series of images. The apparatus may include means for transmitting the tracking template to the mobile device.

Embodiments of such an apparatus may include one or more of the following: The apparatus may include means for identifying using the first image, a stored reference template that corresponds to the target. The apparatus may include means for transmitting the stored reference template to the mobile device. The apparatus may include means for transmitting data linked with the stored reference template to the mobile device. The apparatus may include means for generating pose information using the first image, wherein the pose information represents a relationship between the stored reference template and the target. The means for creating the tracking template may comprise means for rectifying the first image using the pose information. The means for creating the tracking template may further comprise means for cropping the rectified first image.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
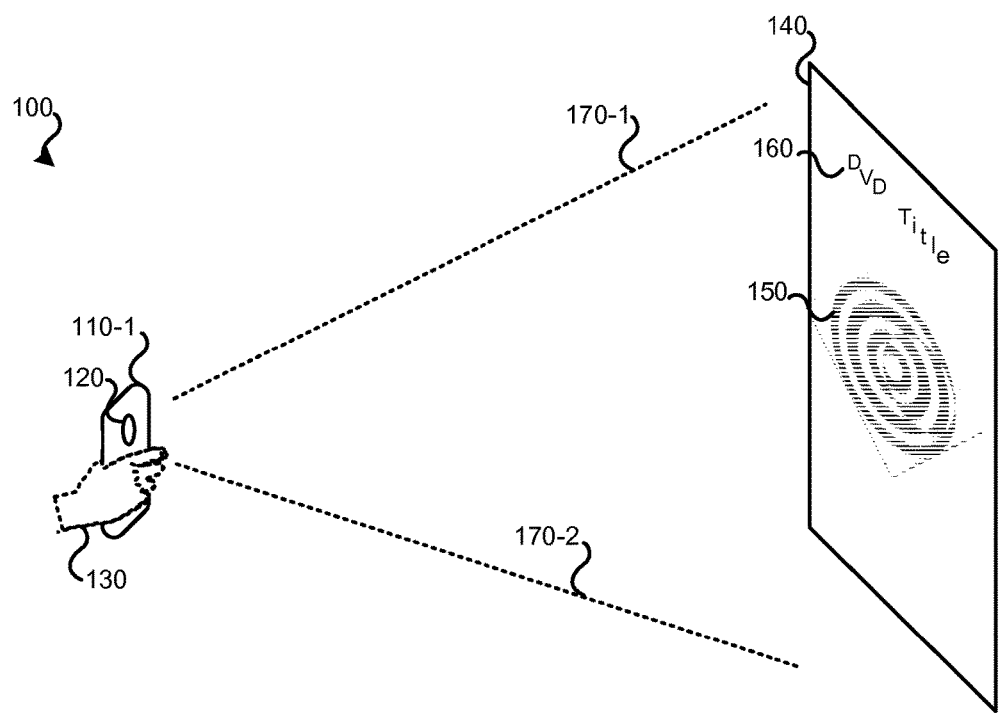
FIG. 1 illustrates an embodiment of a mobile device configured to detect and track an entity.

Detecting and tracking a target within a set of images may be useful for various purposes, such as augmented reality. Once an entity desired to be tracked, referred to as a target, has been detected, the location of the target within subsequent images may be tracked. For example, if a user is aiming a camera of a mobile device, such as a cellular phone, in the general direction of an entity, the entity may first be detected as a target and then tracked in subsequent images. The location of the entity within subsequent images may change due to motion of the user holding the mobile device and/or motion of the target being tracked.

Various forms of augmented reality may rely on an entity within an image being detected and tracked in subsequent images. Such images may be displayed to a user containing additional information (that is, augmenting the image with additional information). The additional information presented to the user may be at least partially based on which entities are present in the image. Such an entity may be detected as a target and tracked in subsequent captured images. The additional information may be presented to the user concurrently with the target. As such, as the target is being tracked in subsequent images, the location of the additional information presented to the user may be affected by the location of the target within the subsequent images.

As an example, while visiting a movie rental store, a user may point a camera of a mobile device, such as a cellular phone, at a DVD case. While pointed at the DVD case, the mobile device may detect the DVD case as a target (because the DVD case is sufficiently similar to a stored reference template) and retrieve information linked with the movie of that particular DVD case. In this example, the information is a movie trailer for the DVD. While the DVD case is visible in subsequent images captured by the cell phone's camera, playback of the movie's trailer is overlaid the subsequently captured images, with the trailer's sound track possibly played aloud by the cell phone's audio system. As such, when the subsequent images are displayed to the user via the mobile device's display screen, the user can view the trailer of the movie overlaying the DVD case. As the user moves the mobile device and its camera, the DVD case identified as the target is continued to be tracked in subsequent captured images. The positioning and/or perspective of the trailer as presented on the display screen is adjusted such that it appears to be displayed directly on the DVD case as the location of the DVD case within the subsequent images changes. If the user moves the cell phone such that a second DVD case is present in images captured by the mobile device's camera, a trailer associated with the movie associated with the second DVD case may be overlaid the second DVD case.

The above example represents one possible application of detection and tracking of an entity for use with augmented reality. More generally, augmented reality can be used to supplement real-world entities with additional information. Such real-world entities are near limitless: barcodes, consumer products, posters, advertisements, constellations, buildings, landmarks, people, text, and symbols can all be entities that can be augmented with additional information, such as video, text, and/or audio. Besides augmented reality, arrangements for detection and tracking of entities described herein may have additional uses.

In the case of a camera capturing images and the images being overlaid with additional information, detection and tracking may be performed to track the target associated with the additional information. In detection, a computerized device attempts to identify one or more entities present in the image. Once an entity (referred to as the "target") has been recognized in an image, tracking may be performed. The target may be tracked in one or more subsequently captured images. Typically, tracking of a target uses less processing than detection of the target.

In some forms of detection, information (e.g., keypoints, descriptors) from an image captured by the camera is compared to information (e.g., keypoints, descriptors) linked with stored reference templates. If a stored reference template is found to be a match (e.g., similar within a certain amount of tolerance), the stored reference template can be used for tracking in subsequent images captured by the camera. However, the use of a stored reference template for tracking may not be effective for successful tracking. For example, while a stored reference template may be similar to the target present in an image captured by the camera and may be considered a "match," the differences between the stored reference template and the target may adversely impact tracking in subsequent images.

As such, once a stored reference template has been matched to a target appearing in an image, rather than using the stored reference template for tracking, a tracking template may be created from the image. As such, it may be expected that the tracking template will very closely match the target because the tracking template was created using an image of the actual target. Accordingly, tracking may be more successful and/or less processor-intensive because the tracking template being used is more similar to the target than a reference template. The reference template and/or information associated with the reference template may be retrieved and presented to the user, possibly as part of an augmented reality display.

FIG. 1 illustrates an embodiment of a system 100 that includes a mobile device 110-1 configured to detect and track an entity using dynamic template tracking. System 100 is an exemplary arrangement configured to detect and track (e.g., locate in multiple images) one or more entities. In the illustrated embodiment, the entity is identified and tracked such that additional information related to the entity can be presented to the user via an augmented reality display.

Mobile device 110-1 is being held by user 130 (for simplicity, FIG. 1 illustrates only the user's hand). Mobile device 110-1 may be a cellular phone, such as a smartphone. Mobile device 110-1 can also be some other type of portable electronic device capable of capturing images and displaying images to user 130, such as a portable music player, handheld gaming device, tablet computer, laptop computer, or PDA. Mobile device 110-1 includes image capture device 120. Image capture device 120 may be configured to capture still images and/or video. In some embodiments, image capture device 120 is capable of capturing approximately 30 images per second. The field of view of image capture device 120 is illustrated by imaginary lines 170-1 and 170-2.

In system 100, image capture device 120 of mobile device 110-1 is capturing one or more images (e.g., a series of images, which may be video or a series of still images) that includes DVD case 140. Some or all of the images may be presented to user 130 via a display screen of mobile device 110-1. DVD case 140 displays DVD title 160 and graphic design 150. DVD title 160 and graphic design 150 may be specific to a particular movie or TV show (collectively referred to as the "video content"). As such, the images captured by image capture device 120 of DVD case 140 may contain sufficient information to identify the video content associated with DVD case 140 (e.g., without requiring user 130 to specify data specific to DVD case 140). A display (not illustrated) of mobile device 110-1 may display the field of view of image capture device 120, which includes DVD case 140 (including DVD title 160 and graphic design 150), to user 130. A system, such as system 200 of FIG. 2, may be used to: 1) identify an entity in the field of view of mobile device 110-1, such as DVD case 140; 2) track DVD case 140 in subsequent images captured by image capture device 120 using a tracking template created for a previous image of DVD case 140; 3) identify additional data, such as video content, associated with DVD case 140; and 4) present the additional data to the user, such as via an augmented reality display of mobile device 110-1. If the additional information is a movie trailer, the movie trailer may be overlaid some or all of DVD case 140 on the display screen of mobile device 110-1. For example, the DVD trailer may overlay (and, therefore, at least partially hide) graphic design 150. DVD title 160 may remain visible on the display of mobile device 110-1 to user 130. As the hand of user 130 moves mobile device 110-1, the position of DVD case 140 within images captured by image capture device 120 may change. As such, the positioning and perspective of the trailer displayed via mobile device 110-1 may be adjusted.

System 100 of FIG. 1 represents a possible application of a mobile device performing dynamic template tracking. However, it should be understood that system 100 is only an example. Many other applications, besides augmented reality of DVD covers may be possible. For example, images of barcodes, text, products, people, advertisements, buildings, landmarks, and/or symbols may be other entities that could be used in other embodiments for dynamic template tracking and/or augmented reality.

In order to detect a target within an image captured by mobile device 110-1, information derived from the image may be compared with stored reference information. For example, various keypoints within an image captured by mobile device 110-1, along with the creation of descriptors that detail the gradient of luminescence in the vicinity of some or all of the keypoints, may be used to identify a representative stored reference template. One or more keypoints and/or descriptors from the captured image may be compared with one or more keypoints and/or descriptors from one or more stored reference templates. A comparison between the keypoints and/or descriptors of the image captured by mobile device 110-1 and the keypoints and/or descriptors of the reference templates may allow a reference template that likely represents the target present in the image captured by mobile device 110-1 to be identified. A reference template that "represents" an entity in the image captured by mobile device 110-1 may be a reference template that is similar enough to the entity in the captured image that the reference template and entity in the captured image are expected to be linked with a same set of additional information. As an example of this, consider a DVD case and a stored reference template of a movie poster for the same movie. While the arrangement of information on the case and reference template may vary (e.g., different location, slightly different graphics), both the DVD case and the reference template are related to the same movie trailer, which may be the additional information linked with the reference template. As such, while the reference template has differences from the DVD case, both are related to the same underlying information (the same movie) and the trailer linked with the reference template is relevant to the DVD case.

Figure 2:
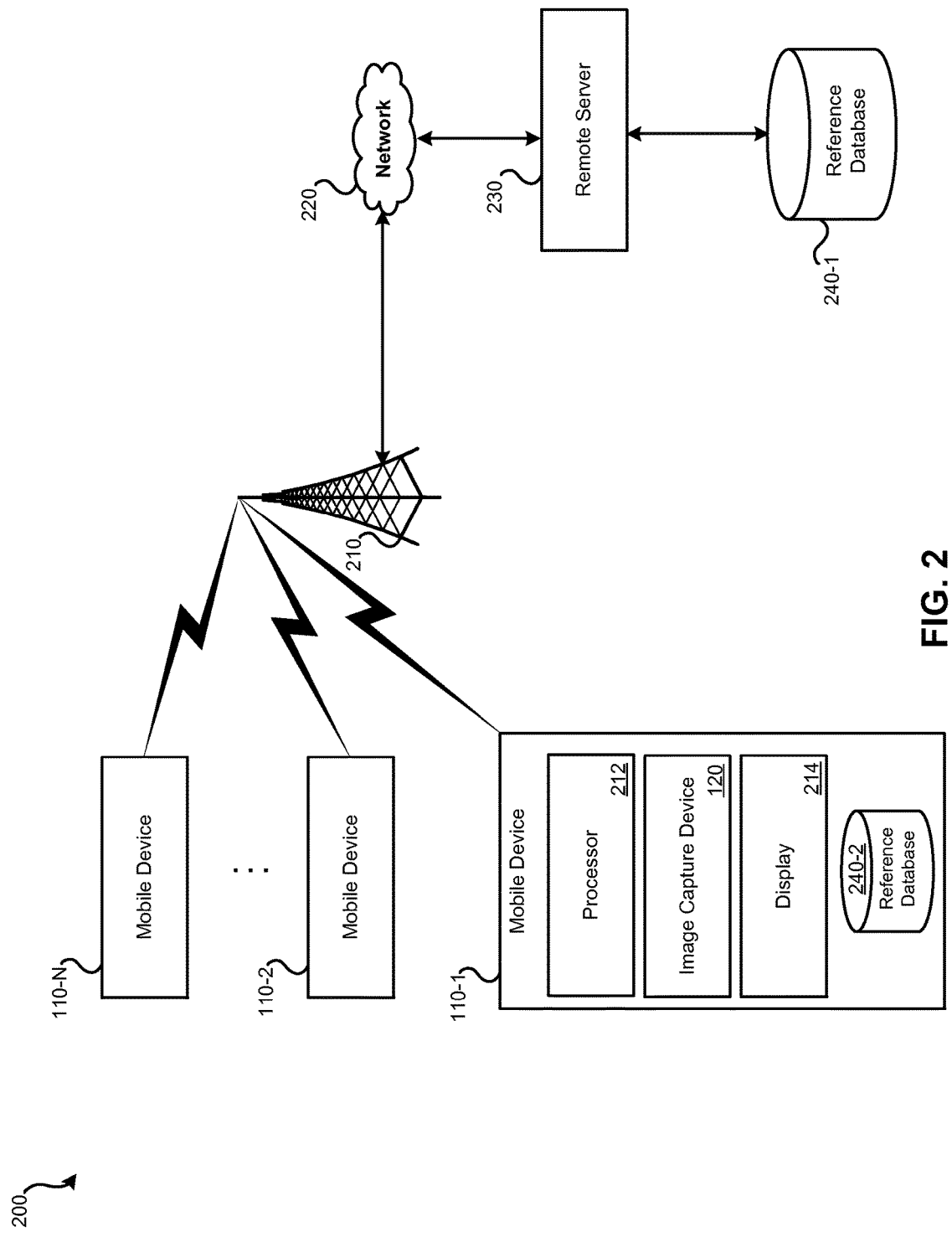
FIG. 2 illustrates an embodiment of a system configured for dynamic template tracking.

FIG. 2 illustrates an embodiment of a system 200 configured for dynamic template tracking. System 200 may include components such as: mobile devices 110, wireless network 210, network 220, remote server 230, and reference databases 240.

Mobile devices 110 can communicate wirelessly with wireless network 210. Wireless network 210 may represent a cellular network. In some embodiments, some or all of mobile devices 110 may communicate with a local wireless network, such as a household Wi-Fi network. Other embodiments of wireless networks are also possible. Wireless network 210 may communicate with remote server 230 via network 220. Network 220 may represent a public network (such as the Internet), private network (such as a corporate intranet), or some combination thereof.

Remote server 230 may represent a computer system that mobile devices 110 are configured to communicate with when performing dynamic template tracking. Remote server 230 may have locally stored, or may have remote access to, stored reference templates. The reference templates may be stored in a reference database 240-1. The reference templates may be a set of images (or keypoints and descriptors) of entities that may be targets in images captured by mobile devices 110. For example, tens, hundreds, thousands, or even hundreds of thousands of images (or keypoints and descriptors) of various entities may be stored as reference templates. Some or all of these reference templates may be linked with additional information. If a large number of reference templates are present, reference database 240-1 may require significant storage capacity. Each reference template may have associated with it various keypoints (such as 100 keypoints) and descriptors associated with some or all of those keypoints. These keypoints and descriptors may be used to determine if the reference template represents an entity present in an image captured by mobile device 110-1 within a certain amount of tolerance. In some embodiments, reference templates contain information sufficient to identify entities as targets and do not contain an image of the entity the reference template represents.

In some embodiments, rather than reference database 240-1 being in communication with a remote server 230 and accessible by mobile devices 110 via wireless network 210 and network 220, the reference templates may be stored locally by mobile devices. Referring to mobile device 110-1, a reference database 240-2 may be stored locally. Reference database 240-2 may contain similar data to reference database 240-1. In some embodiments, reference database 240-2 may first be searched for a representative reference template, and if none is found, reference database 240-1 may be searched. If only reference database 240-2 is used, communication with remote server 230 may not be necessary. Reference templates stored locally in reference database 240-2 may be fewer in number than reference templates stored in reference database 240-1 due to the amount of available storage space at mobile device 110-1. Reference databases 240 may also store additional data linked with each reference template. In some embodiments, such data is stored in a separate storage arrangement.

Mobile devices 110 may include three mobile devices as illustrated. This number of mobile devices 110 is for exemplary purposes only; more or fewer mobile devices may be present. Mobile device 110-1 is illustrated as having additional components. Other mobile devices may also have these or similar components. Mobile device 110-1 contains processor 212, image capture device 120, display 214, and reference database 240-2. Processor 212 may be used to process images captured by image capture device 120, such as to identify keypoints and/or descriptors. Image capture device 120 may capture still images and/or video (e.g., a series of images captured shortly after the previous image). Display 214 may be used to present some or all of the images captured by image capture device 120 to a user. Display 214 may be used to present the user with an augmented reality display, such as images captured by image capture device 120 overlaid with data retrieved from remote server 230. Display 214 may be a display screen of a mobile device. In some embodiments, the display may be some form of head-mounted display, such as glasses that are worn by a user. In such embodiments, the image capture device may be mounted on the glasses and/or pointed in the direction that the glasses are facing (such that image capture device 120 captures an image containing a similar scene to what the user is likely viewing). Reference database 240-2 may be used to store reference templates for identifying targets in images captured by image capture device 120.

In some embodiments, processing of the images captured by a mobile device 110-1 is performed by mobile device 110-1. In other embodiments, some or all of the image processing may be performed remotely, such as by remote server 230. In such embodiments, mobile device 110-1 may transmit an image captured to remote server 230 for processing. Following processing by remote server 230, tracking may be performed locally by mobile device 110-1.

Figure 3:
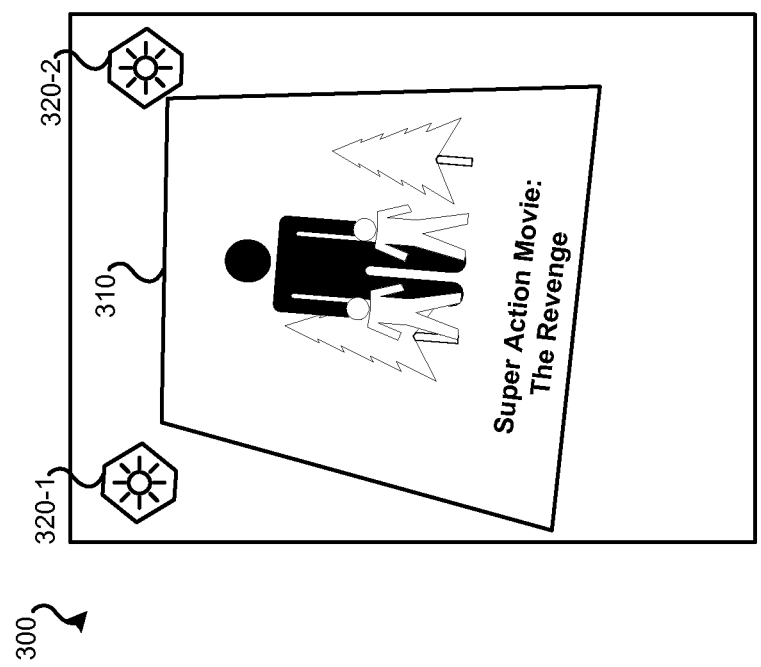
FIG. 3 illustrates an embodiment of a captured image.

FIG. 3 illustrates an embodiment of an image 300 captured by a mobile device. In this embodiment, a user has used a mobile device, such as mobile device 110-1 of FIG. 1, to capture an image of movie poster 310. In the illustrated embodiment, movie poster 310 is for a movie called "Super Action Movie: The Revenge." On movie poster 310 are graphics associated with the movie. Movie poster 310 appears skewed because the user operating the mobile device used to capture the image captured the image from an angle to the poster. In addition to movie poster 310, other entities may be present in the captured image. As an example, two lights 320 are shown.

From this image captured by the mobile device, keypoints and/or descriptors may be identified (either locally by the mobile device or by a remote server, such as remote server 230 of FIG. 2). The keypoints and/or descriptors may be used to identify a reference template that is either stored locally or remotely. The reference template may be stored among a plurality of reference templates by either the mobile device or by a remote storage device, such as reference database 240-2 or reference database 240-1, respectively.

Figure 4:
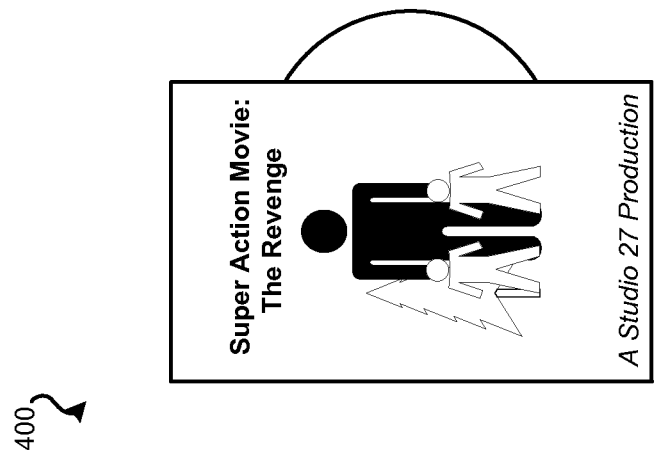
FIG. 4 illustrates an embodiment of a reference template that represents a target in the captured image of FIG. 3.

FIG. 4 illustrates an embodiment of a reference template 400. Reference template 400 is an image of a DVD case with a protruding DVD for the movie "Super Action Movie: The Revenge." Reference template 400 may have been selected from a plurality of reference templates based on the similarity of keypoints and/or descriptors linked with image 300 of FIG. 3 and keypoints and/or descriptors linked with reference template 400 of FIG. 4. As such, the identified reference template 400 of FIG. 4 correctly relates to the DVD cover of image 300 of FIG. 3. While movie poster 310 and the DVD case of reference template 400 are different entities, both relate to the same underlying information: the movie "Super Action Movie: The Revenge." As such, information relevant to the reference template 400 is likely to be relevant to the movie poster, such as a trailer for the movie.

Differences between the target (movie poster 310) of FIG. 3 and reference template 400 of FIG. 4 are present. For example, one major difference between reference template 400 and the target of image 300 is that a DVD is partially protruding from the DVD case in reference template 400. Additionally, the title of the movie is located in a different position in reference template 400 than movie poster 310 of image 300. Other differences are also present, such as the "A Studio 27 Production" language at the bottom of reference template 400. Such differences may be insubstantial enough that detection can still be performed accurately. However, such differences may adversely affect tracking if reference template 400 is used for tracking the target of image 300 in subsequent images captured by the mobile device.

As such, rather than using the reference template for tracking, dynamic template tracking allows for a tracking template to be created from a captured image of the target to be tracked. Once a target in an image has been detected using a reference template, the image captured by the mobile device may undergo various processing in order to create a tracking template that will be used for tracking in subsequent images captured by the mobile device. Referring to the example of FIGS. 3 and 4, reference template 400 may be used to detect the target of movie poster 310 in image 300. However, for tracking the target, a tracking template may be created from image 300.

Figure 5:
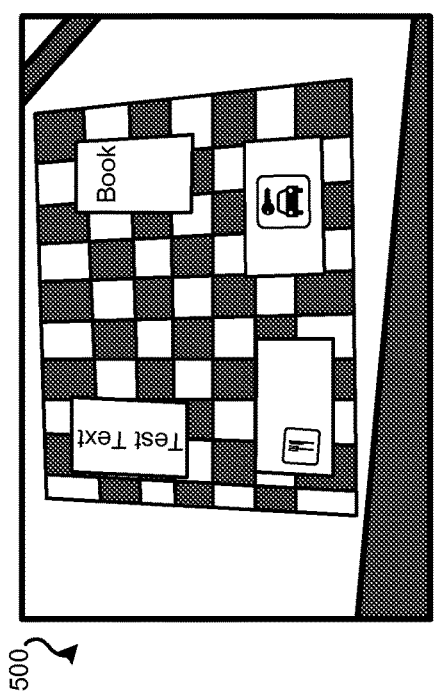
FIG. 5 illustrates another embodiment of a captured image.
Figure 6:
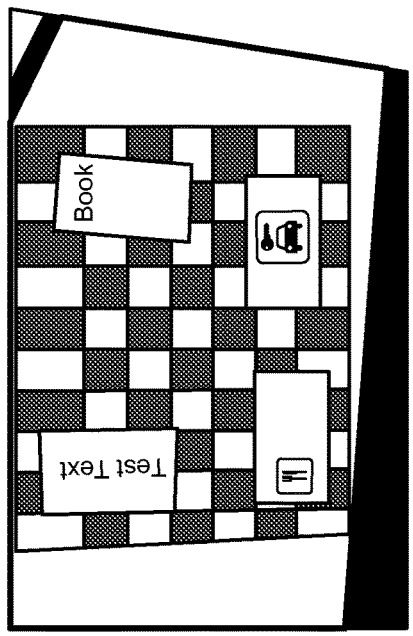
FIG. 6 illustrates an embodiment of the captured image of FIG. 5 rectified.
Figure 7:
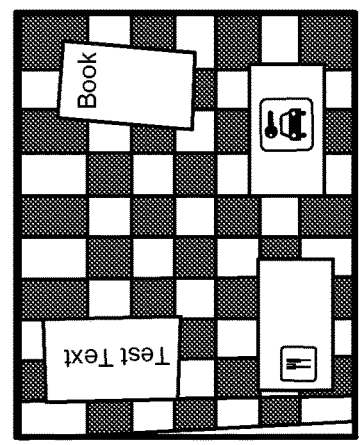
FIG. 7 illustrates an embodiment of the rectified image of FIG. 6 cropped.

FIGS. 6 and 7 illustrate images that may be created based on a captured image of FIG. 5. In FIGS. 6 and 7, the checkerboard has been identified as a target identified through comparison of keypoints and/or descriptors of image 500 of FIG. 5 with keypoints and descriptors of a reference template.

FIG. 5 illustrates an embodiment of an image 500 captured by a mobile device, such as mobile device 110-1 of FIG. 1. Based on a comparison between the keypoints and/or descriptors of image 500 and the keypoints and/or descriptors of one or more reference templates, a particular reference template may be identified as representing a target within image 500. This reference template may indicate that the checkerboard is the target. As such, for tracking purposes, a tracking template may be created from image 500. FIG. 6 illustrates an embodiment of a rectified image created using image 500. Rectified image 600 corrects image distortion (such as by the mobile device capturing image 500 being held at an angle to the checkerboard) by transforming the image to a standard coordinate system. Rectifying may be performed using methods such as Affine warping or perspective warping. Rectifying may make rectified image 600 checkerboard appear viewed from approximately straight on. FIG. 7 illustrates an embodiment of a cropped image created using rectified image 600. Image 700 may be cropped such that only the target (and objects on the target) are substantially present in image 700. As such, image 700 may be used as a tracking template for tracking the checkerboard in subsequent images captured by the mobile device that captured image 500.

Figure 8:
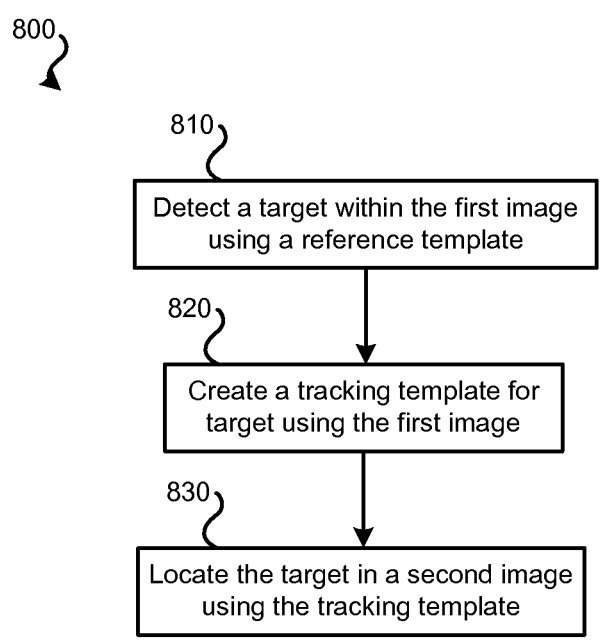
FIG. 8 illustrates an embodiment of a method for dynamic template tracking.

Mobile devices, such as mobile device 110-1, along with system 200, or some other system that is configured for dynamic template tracking, may be used to perform various methods for dynamic template tracking FIG. 8 illustrates an embodiment of a method 800 for dynamic template tracking performed using a mobile device. Each stage of method 800 may be performed by a mobile device, such as mobile device 110-1. Alternatively, each stage of method 800 may be performed by a computer system, such as remote server 230.

At stage 810, a target within a first image may be detected using a stored set of reference tracking templates. In order to detect the entity within the first image that is the target, one or more keypoints and/or descriptors for the first image may be identified. These keypoints and descriptors may be compared with keypoints and/or descriptors for one or more of the reference templates. If the keypoints and/or descriptors for one of the reference templates is sufficiently close enough (e.g., within a predetermined amount of tolerance) of the keypoints and/or descriptors for the first image, the reference template may be considered to represent a target within the first image. Because this target matches a reference template, it may be tracked.

At stage 820, a tracking template may be created for the target detected within the first image. The tracking template may be created using the first image. The first image may be rectified and/or cropped to create an image that substantially contains only the target to be tracked. As such the tracking template may be created from the first image that was used for comparison with the reference templates. In some embodiments, the tracking template may be created by some other image captured before or after the first image of the target was captured.

At stage 830, the target may be located in a second image using the tracking template. The second image may be captured after the first image. It should be understood that one or more other images may have been captured between when the first image and the second image were captured. For example, an image capture device may continually capture images in the form of video. The target may also be located in images captured subsequent to the second image using the tracking template. As such, the tracking template can be used to track the target in a series of captured images, such as video. Tracking the target using the tracking template, which was created using an image of the actual target being tracked, may be more effective (e.g., more likely to correctly follow the target and/or be less processor-intensive) than tracking using the reference template.

Figure 9:
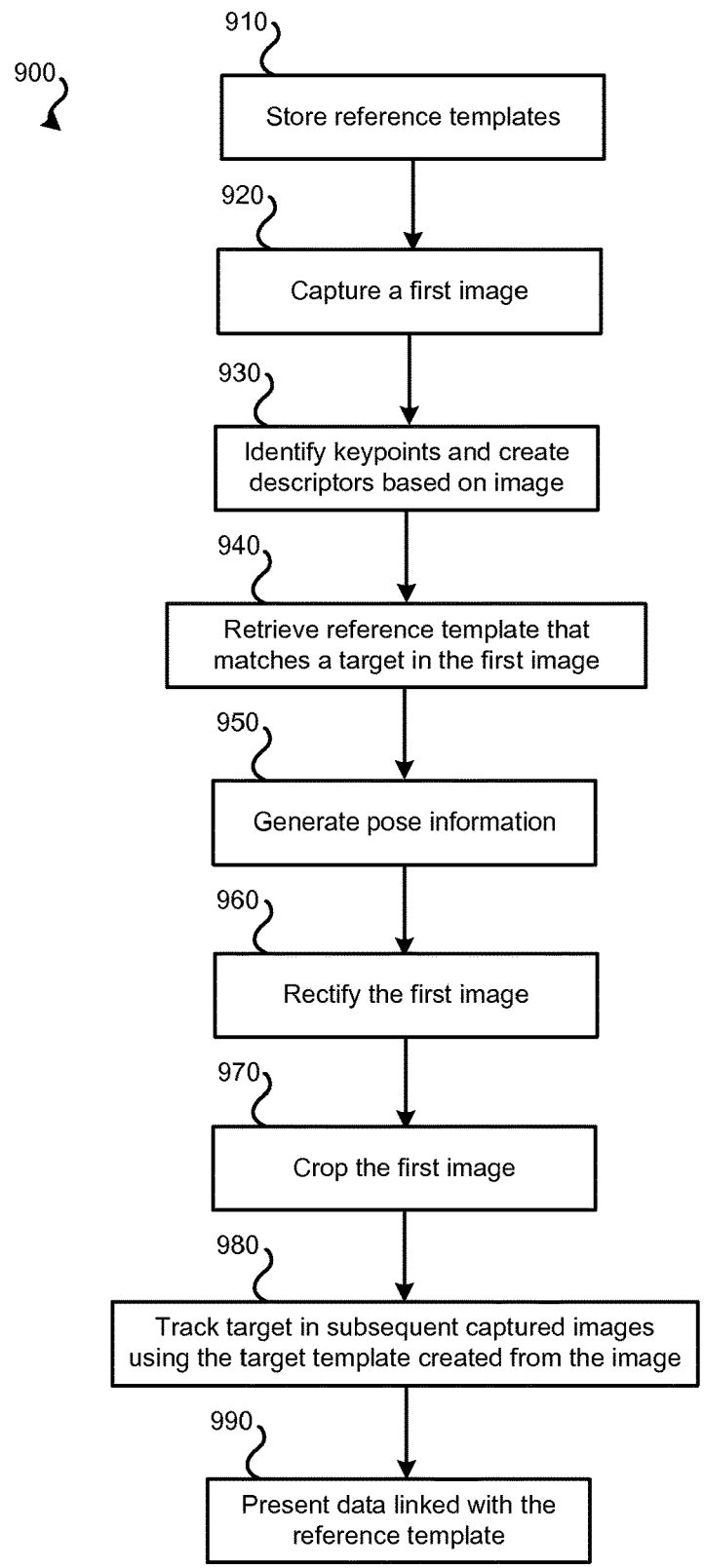
FIG. 9 illustrates an embodiment of a method for dynamic template tracking performed by a mobile device.

FIG. 9 illustrates an embodiment of a method 900 for dynamic template tracking performed by a mobile device. In embodiments of method 900, reference templates are stored locally by the mobile device. Method 900 may be performed using system 200 or some other system that is configured for dynamic template tracking. Referring to system 200 of FIG. 2, mobile device 110-1 may use reference templates stored in reference database 240-2.

At stage 910, a plurality of reference templates may be stored by the mobile device. These reference templates may be stored using a tangible (e.g., non-transitory) computer-readable medium. These reference templates may be stored prior to an image being captured for dynamic template tracking at stage 920. In some embodiments, the number of reference templates present in the plurality of reference templates may be small, such as 10. In other embodiments, the number of reference templates stored may number in the thousands or hundreds of thousands. The reference templates may be stored on the mobile device using a database. In some embodiments, all of the reference templates may be directed to a particular topic. For example, each reference template may be related to a movie. The reference templates may be images. The images may be linked with keypoints and descriptors. In some embodiments, the reference templates may only include keypoints and descriptors, with no corresponding image being stored. Each reference template may be linked with additional information either stored locally by the mobile device or remotely, such as at a remote server.

At stage 920, the mobile device may capture an image. Referring to mobile device 110-1 of FIG. 2, image capture device 120 may be used to capture an image. The image may be a still image or a frame of video. At stage 930, various keypoints and/or descriptors within this image may be identified by the mobile device. In some embodiments, approximately one hundred keypoints are identified in the image captured at stage 920. For some or all of the keypoints, descriptors (which represent the gradient of luminescence in the vicinity of the corresponding keypoint) may be created.

At stage 940, the computer-readable storage medium storing the reference templates may be accessed and a reference template that represents an entity within the captured image may be retrieved. The keypoints and descriptors identified for the captured first image at stage 930 may be used to search the stored reference templates at stage 940. The search may be an attempt to identify a reference template that has similar keypoints and/or descriptors (within some amount of tolerance). If no reference template has similar keypoints and/or descriptors within some amount of tolerance to the first image, this may mean that no target to be tracked is present (or at least could be successfully identified) within the image. If a reference template having similar keypoints and descriptors is found, this reference template may be determined to represent an entity that is the target in the image captured at stage 920. As an example, image 300 contains a target of a poster related to the same movie as reference template 400 of FIG. 4. While similar, the movie poster of image 300 and reference template 400 are not identical, but may be similar enough that the reference template is considered to represent the target.

At stage 950, pose information may be generated by the mobile device. A technique, such as homography, may be used to generate pose information that represents the relationship between the reference template retrieved at stage 940 and the target of the image captured at stage 920. For example, this pose information may serve to describe the relationship between a target in an image captured at an angle (such as movie poster 310 of image 300 of FIG. 3) to a reference template (such as reference template 400 of FIG. 4).

At stage 960, the captured image containing the target may be rectified. Rectifying the image captured at stage 920 can correct image distortion (such as image distortion caused by the mobile device capturing image 500 being held at an angle to the target) by transforming the image to a standard coordinate system. This may involve creating a new image based on the first image or modifying the first image. Methods such as Affine warping or perspective warping may be used. As such, following stage 960, an image may be created that appears as if the target is viewed from approximately straight on.

At stage 970, the rectified image of stage 960 may be cropped. The cropping may eliminate some or all portions of the rectified captured image besides the target. Cropping the image may involve editing the rectified image or creating a new image from the rectified image. As such, following stage 970, a rectified, cropped image of the target may have been created by the mobile device. While the previous three stages refer to various image processing functions, it should be understood that other image processing may also be performed, such as contrast adjustment, image rotation, brightness adjustment, color adjustment, etc.

At stage 980, the rectified and cropped image created at stage 970 may be used as the tracking template for tracking the target in images captured by the mobile device subsequent to the capture of the first image. Such tracking can involve locating the target in each (or at least some) subsequent images captured by an image capture device of the mobile device. Use of this rectified, cropped image as the tracking template may allow for efficient tracking because the tracking template is created from an actual image of the target being tracked in subsequent images. As such, tracking using the tracking template may be more successful than tracking using the reference template, due to possible variances between the reference template that is determined to represent the target and the actual target.

At stage 990, user-discernable information (or data) that is linked with the reference template retrieved at stage 940 may be presented to the user. This user-discernable data may be stored locally by the mobile device or remotely, such as by a remote server. If stored remotely, the mobile device may first request the data based on the reference template selected. Some or all of the user-discernable data may be presented to the user. For example, referring to the examples of FIGS. 3 and 4, the data associated with reference template 400 of FIG. 4 may be a trailer for the movie on the DVD. This trailer may be presented by the mobile device to the user. In some embodiments, the data associated with the reference template is presented to the user via an augmented reality display. Referring again to the example of the movie trailer, the trailer may be presented on a screen of the mobile device to the user. The screen may show a series of images (e.g., a video stream) captured by the mobile device's image capture device. The target may continue to be tracked in this series of images. Overlaying the series of images may be the trailer. For example, the trailer, possibly using the pose information generated at stage 950, may be displayed to appear to be playing back on the movie poster present in the field of view of the mobile device. If the image capture device is moved, and thus the movie poster target in the field of view of the image capture device moves, the portion of the screen used to display the trailer may change such that it still appears that the trailer is being played back on the movie poster. While this is occurring, images captured by the image capture device of the mobile device may be searched for additional targets by identifying keypoints and descriptors and comparing such keypoints and descriptors to stored reference templates.

Figure 10:
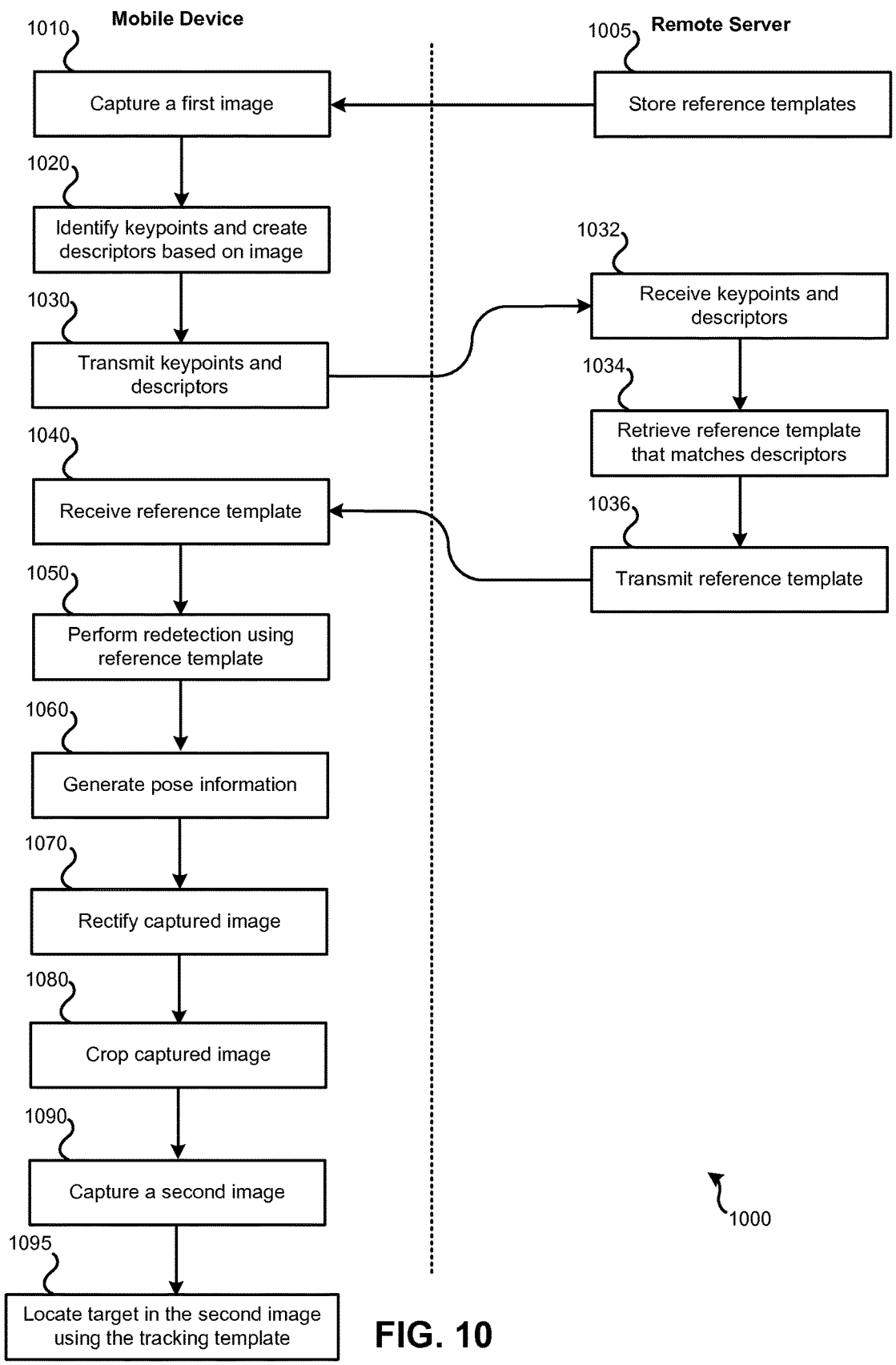
FIG. 10 illustrates an embodiment of a method for dynamic template tracking performed by a mobile device in communication with a remote server.

FIG. 10 illustrates an embodiment of a method for dynamic template tracking performed by a mobile device that communicates with a remote server. In embodiments of method 1000, reference templates are stored remote from the mobile device used to capture images. Method 1000 may be performed using system 200 or some other system that is configured for dynamic template tracking. Referring to system 200 of FIG. 2, mobile device 110-1 may capture images while the reference template is retrieved from a remote server, such as remote server 230 of system 200.

At stage 1005, a plurality of reference templates may be stored by the remote computer system. These reference templates may be stored using a tangible (e.g., non-transitory) computer readable medium. These reference templates may be stored prior to an image being captured for dynamic template tracking at stage 1010. In some embodiments, the number of reference templates may be small, such as 10. In other embodiments, the number of reference templates in the plurality of reference templates may number in the thousands or hundreds of thousands. The reference templates may be stored by the remote server in a database. In some embodiments, all of the reference templates may be directed to a particular topic. For example, each reference template may be related to a movie. The reference templates may be images. The images may be linked with keypoints and descriptors. In some embodiments, the reference templates may only include keypoints and descriptors, with no actual image being stored. Each reference template may be linked with additional information either stored locally by the mobile device or remotely, such as at a remote server.

At stage 1010, the mobile device may capture an image. Referring to mobile device 110-1 of FIG. 2, image capture device 120 may be used to capture an image. The image may be a still image or a frame of video. At stage 1020, various keypoints and/or descriptors within this image may be identified by the mobile device. In some embodiments, approximately one hundred keypoints are identified in the image captured at stage 1010. For some or all of the keypoints, descriptors (which represent the gradient of luminescence in the vicinity of the corresponding keypoint) may be created.

At stage 1030, the keypoints and/or the descriptors may be transmitted to the remote server by the mobile device using one or more networks. At stage 1032, the keypoints and/or descriptors may be received by the remote server. In some embodiments only keypoints are used, and in some embodiments keypoints and descriptors may be used. It may also be possible to use only descriptors.

At stage 1034, based on the keypoints and/or descriptors, the remote server may retrieve a reference template linked with similar keypoints and/or descriptors (within an amount of tolerance) from a tangible (e.g., non-transitory, manufactured) computer readable medium. For example, the remote server may access a database, such as reference database 240-2 of FIG. 2, stored on a computer readable medium to search the reference templates. A reference template that is retrieved may be selected from among hundreds, thousands, or hundreds of thousands of reference templates stored by the remote server. At stage 1036, the reference template determined to represent a target in the first image retrieved by the remote server may be transmitted to the mobile device. If no reference template is determined to represent a target in the first image, a response indicating as such may be transmitted to the mobile device. At stage 1040, the reference template, if any, may be received by the mobile device.

At stage 1050, redetection using the reference template received from the remote server may be performed by the mobile device. Redetection may involve redetecting the target within an image captured more recently than the image captured at stage 1010. For example, in some embodiments, the mobile device may be capturing images periodically, such as several times per second. During the time that elapsed between stages 1010 and 1040, a user may have moved the mobile device such that the target is being viewed from a different angle and/or in a different position within the image capture device's field of view. During this time, the mobile device may have continued to capture images. As such, redetection may allow for a more recent captured image to be used for generating pose information to allow for a (more) accurate relationship between the reference template and the target. Accordingly, stage 1050 may involve the capture of one or more additional images of the target to be used for redetection. The redetection of stage 1050 may involve identifying the keypoints and/or the descriptors present within the more recently captured image.

At stage 1060, pose information may be generated by the mobile device. A technique, such as homography, may be used to generate pose information that represents the relationship between the reference template received at stage 1040 and the target of the image captured at stage 1010 or 1050.

At stage 1070, the captured image containing the target may be rectified. Rectifying the image captured at stage 1010 can correct image distortion (such as image distortion caused by the mobile device capturing image 500 being held at an angle to the target) by transforming the image to a standard coordinate system. This may involve creating a new image based on the first image or modifying the first image. Methods such as Affine warping or perspective warping may be used. As such, following stage 1070, an image may be created that appears as if the target is viewed from approximately straight on.

At stage 1080, the rectified image of stage 1070 may be cropped. Cropping may eliminate some or all portions of the rectified captured image besides the target. Cropping the image may involve editing the rectified image or creating a new image from the rectified image. As such, following stage 1080, a rectified, cropped image of the target may have been created by the mobile device.

At stage 1090, a second image may be captured. One or more additional images may have been captured by the image capture device of the mobile device between stages 1010 and 1090, such as at stage 1050.

At stage 1095, the rectified and cropped image created at stage 1080 may be used as the tracking template for tracking the target in images captured by the mobile device subsequent to the capture of the first image, such as the second image captured at stage 1090. Such tracking can involve identifying the target in each (or at least some) subsequent images captured by an image capture device of the mobile device. Use of this rectified, cropped image as the tracking template may allow for efficient tracking because the tracking template is created from an actual image of the target to be tracked in subsequent images. As such, tracking using the tracking template may be more successful than tracking using the reference template, due to possible variance between the reference template that represents the target and the actual target.

Concurrent with stage 1095, data that is linked with the reference template received at stage 1040 may be presented to the user. This data may be retrieved from the remote server. The remote server may transmit this data in response to retrieving the reference template at stage 1034. Some or all of the data may be presented to the user. In some embodiments, the data associated with the reference template (and/or an image of the reference template) is presented to the user via an augmented reality display.

Figure 11:
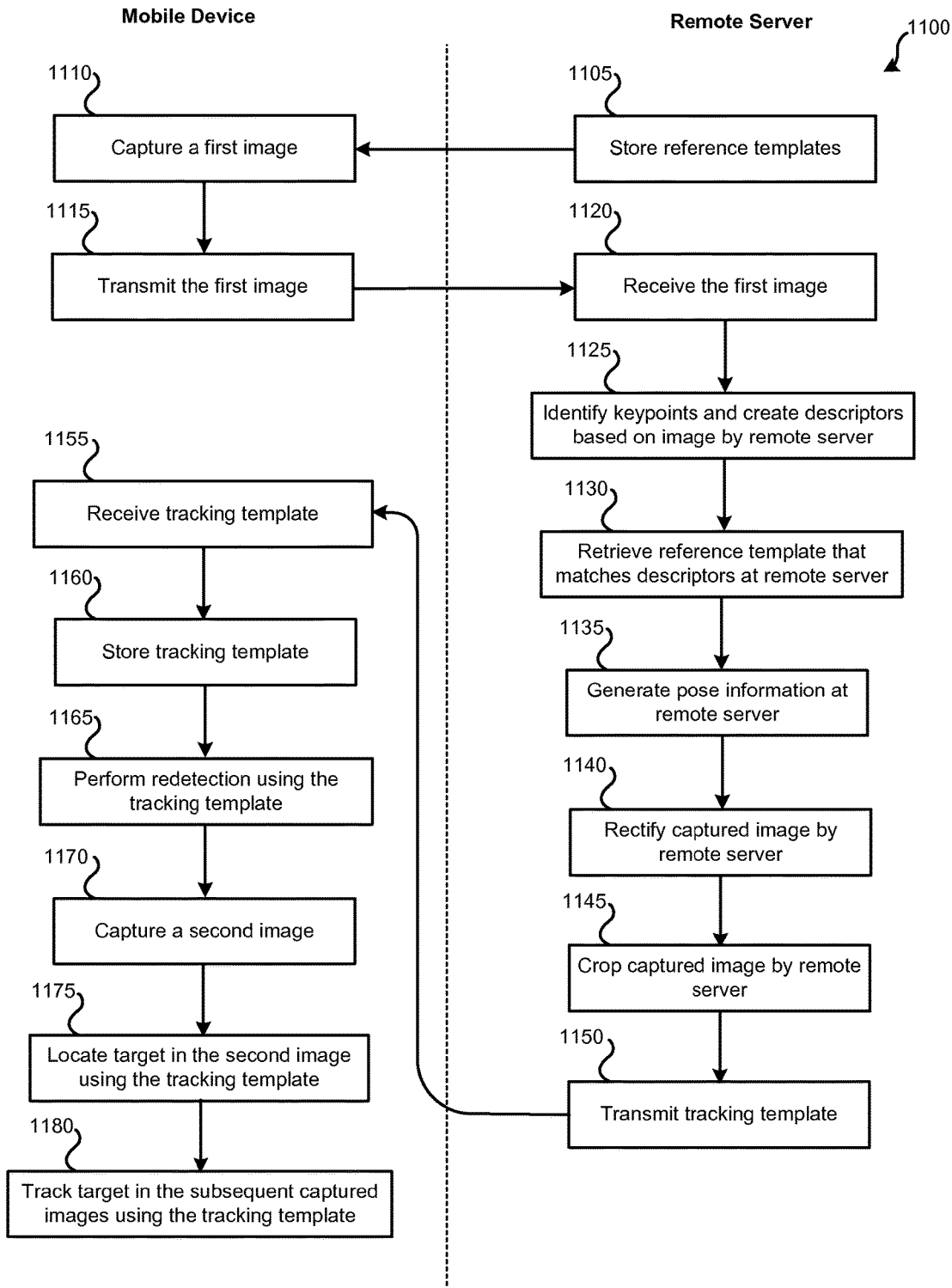
FIG. 11 illustrates another embodiment of a method for dynamic template tracking performed by a mobile device in communication with a remote server.

FIG. 11 illustrates another embodiment of a method 1100 for dynamic template tracking performed by a mobile device that communicates with a remote server. In embodiments of method 1100, reference templates are stored remote from the mobile device used to capture images. Further, processing of the images captured by the mobile device is performed by the remote server. Method 1100 may be performed using system 200 or some other system that is configured for dynamic template tracking. Referring to system 200 of FIG. 2, mobile device 110-1 may capture images, while the processing is performed by the remote server, such as remote server 230 of system 200.

At stage 1105, a plurality of reference templates may be stored by the remote computer system. These reference templates may be stored using a computer-readable medium. These reference templates may be stored prior to an image being captured for dynamic template tracking at stage 1110. In some embodiments, the number of reference templates present in the plurality of reference templates may be small, such as 10. In other embodiments, the number of reference templates may number in the thousands or hundreds of thousands. The reference templates may be stored by the remote server in a database. In some embodiments, all of the reference templates may be directed to a particular topic. The reference templates may be images. The images may be linked with keypoints and descriptors. In some embodiments, the reference templates may only include keypoints and descriptors, with no actual image being stored. Each reference template may be linked with additional information stored remote from the mobile device, such as at a remote server.

At stage 1110, the mobile device may capture an image. Referring to mobile device 110-1 of FIG. 2, image capture device 120 may be used to capture an image. The image may be a still image or a frame of video. At stage 1115, the first image captured by the mobile device may be transmitted to the remote server via one or more networks. At stage 1120, the remote server may receive the first image.

At stage 1125, various keypoints and/or descriptors within this image may be identified by the remote server. In some embodiments, approximately 100 keypoints are identified in the image captured at stage 1110. For some or all of the keypoints, descriptors (which represent the gradient of luminescence in the vicinity of the corresponding keypoint) may be created.

Based on the keypoints and/or descriptors, the remote server may retrieve a reference template linked with similar keypoints and/or descriptors (within an amount of tolerance) from a computer-readable medium at stage 1130. For example, the remote server may access a database, such as reference database 240-2 of FIG. 2, stored on a computer readable medium to search the reference templates. A reference template that is retrieved may be selected from among hundreds, thousands, or hundreds of thousands of reference templates stored by the remote server. If no reference template is determined to represent a target found in the image captured, a response indicating as such may be transmitted to the mobile device.

At stage 1135, pose information may be generated by the remote server. A technique, such as homography, may be used to generate pose information that represents the relationship between the reference template retrieved at stage 1130 and the target of the image captured at stage 1110.

At stage 1140, the captured image containing the target may be rectified. Rectifying the image captured at stage 1110 can correct image distortion (such as image distortion caused by the mobile device capturing image 500 being held at an angle to the target) by transforming the image to a standard coordinate system. This may involve creating a new image based on the first image or modifying the first image. Methods such as Affine warping or perspective warping may be used to warp the image using the pose generated at stage 1135. As such, following stage 1140, an image may be created that appears as if the target is viewed from approximately straight on.

At stage 1145, the rectified image of stage 1140 may be cropped. The cropping may eliminate some or all portions of the rectified captured image besides the target. Cropping the image may involve editing the rectified image or creating a new image from the rectified image. As such, following stage 1145, a rectified, cropped image of the target may have been created by the remote server that is to be used as the tracking template. Such creation of the tracking template at the remote server, rather than the mobile device, may be more efficient because of increased processing abilities being available at the remote server and/or less of a concern over power consumption (e.g., if a battery is being used by the mobile device). At stage 1150, the tracking template may be transmitted to the mobile device. At stage 1155, the tracking template may be received by the mobile device. At stage 1160, the mobile device may store the tracking template using a local computer-readable medium, such as memory.

At stage 1165, redetection using the reference template received from the remote server may be performed by the mobile device. Redetection may involve redetecting the target within an image captured more recently than the image captured at stage 1110. For example, in some embodiments, the mobile device may be capturing images periodically, such as several times per second. During the time that elapsed between stages 1110 and 1165, a user may have moved the mobile device such that the target is being viewed from a different angle and/or in a different position within the image capture device's field of view. During this time, the mobile device may have continued to capture images. As such, redetection may allow for a more recent captured image to be used for generating pose information to allow for a (more) accurate relationship between the reference template and the target. Accordingly, stage 1165 may involve the capture of one or more additional images to be used for redetection. The redetection of stage 1165 may involve identifying the keypoints and the descriptors present within the more recently captured image.

At stage 1170, a second image may be captured. To be clear, one or more additional images may have been captured by the image capture device of the mobile device between stages 1110 and 1170, such as at stage 1165.

At stage 1175, the rectified and cropped image received by the mobile device at stage 1155 may be used as the tracking template for tracking the target in the second image captured by the mobile device. Such tracking can involve identifying the target in the second image. Use of this rectified, cropped image as the tracking template may allow for effective (e.g., more accurate) tracking because the tracking template is created from an actual image of the target being tracked in subsequent images. As such, tracking using the tracking template may be more successful than tracking using the reference template, due to possible variances between the reference templates that represent the target and the actual target.

Images may continue to be captured by the mobile device. At stage 1180, the tracking template used to locate the target in the second image may be used to track the image in these subsequently captured images. The tracking template may be used to continue to locate the target in subsequently captured images until the target is no longer in the field of view of the image capture device or is no longer desired to be tracked. Some or all of the images captured by the image capture device of the mobile device may be presented to the user, possibly in the form of an augmented display overlaid with data. In using the tracking template to locate the target in subsequently captured images, additional information from previously captured images may also be used (e.g., the location of the target in the previous image).

Concurrent with stages 1170 and on, data that is linked with the reference template retrieved at stage 1130 may be presented to the user. This data may be retrieved from the remote server. The remote server may transmit this data in response to retrieving the reference template at stage 1130. Some or all of the data may be presented to the user. In some embodiments, the data associated with the reference template (and/or an image of the reference template) is presented to the user via an augmented reality display.

Figure 12:
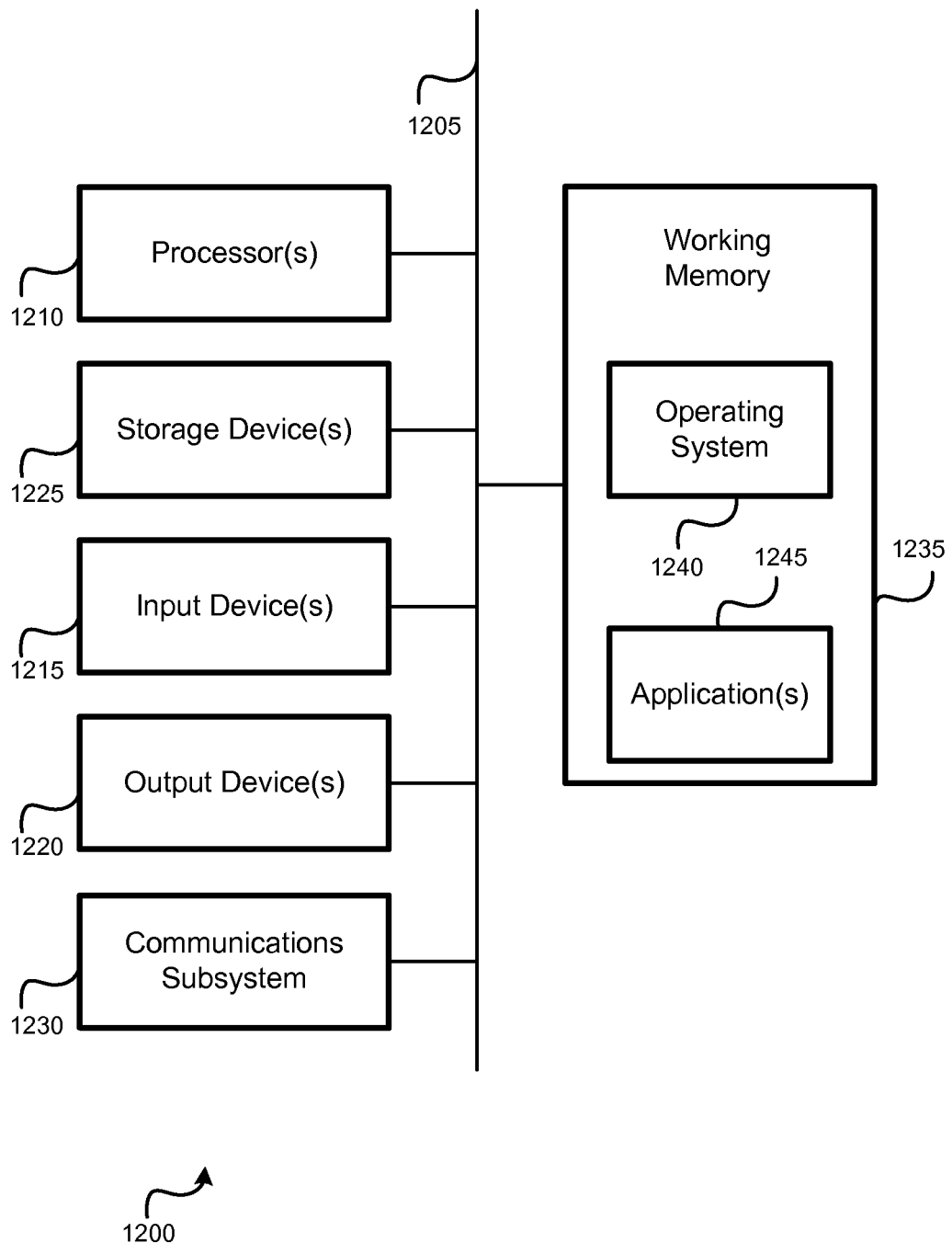
FIG. 12 illustrates an embodiment of a computer system.

The previously detailed mobile devices, such as mobile devices 110 including mobile device 110-1, may be computerized. FIG. 12 illustrates an embodiment of a computer system. Computer system 1200 may represent some of the components of the mobile devices and may represent the described remote servers, such as remote server 230 of FIG. 2. FIG. 12 provides a schematic illustration of one embodiment of a computer system 1200 that can perform the methods provided by various other embodiments, as described herein, and/or can function as the host computer system and/or mobile devices. FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computer system 1200 is shown comprising hardware elements that can be electrically coupled via a bus 1205 (or may otherwise be in communication, as appropriate). The hardware elements may include one or more processors 1210, including without limitation one or more general-purpose processors and/or one or more special-purpose processors (such as digital signal processing chips, graphics acceleration processors, and/or the like); one or more input devices 1215, which can include without limitation a mouse, a keyboard, and/or the like; and one or more output devices 1220, which can include without limitation a display device, a printer, and/or the like. Such a display device may be some form of head-mounted display, such as glasses.

The computer system 1200 may further include (and/or be in communication with) one or more storage devices 1225, which can comprise, without limitation, local and/or network accessible storage and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation various file systems, database structures, and/or the like.

The computer system 1200 might also include a communications subsystem 1230, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1230 may permit data to be exchanged with a network (such as the network described below, to name one example), other computer systems, and/or any other devices described herein. In many embodiments, the computer system 1200 will further comprise a working memory 1235, which can include a RAM or ROM device, as described above.

The computer system 1200 also can comprise software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods. Processor-readable instructions also may refer to dedicated hardware that has been configured to perform such various instructions. For example, such processor-readable instructions may be performed by an application-specific integrated circuit (ASIC).

A set of these instructions and/or code might be stored on a computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1200, and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1200) to perform methods in accordance with various embodiments of the invention. According to a set of embodiments, some or all of the procedures of such methods are performed by the computer system 1200 in response to processor 1210 executing one or more sequences of one or more instructions (which might be incorporated into the operating system 1240 and/or other code, such as an application program 1245) contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processor(s) 1210 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1200, various computer-readable media might be involved in providing instructions/code to processor(s) 1210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1225. Volatile media include, without limitation, dynamic memory, such as the working memory 1235.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1200.

The communications subsystem 1230 (and/or components thereof) generally will receive signals, and the bus 1205 then might carry the signals (and/or the data, instructions, etc. carried by the signals) to the working memory 1235, from which the processor(s) 1210 retrieves and executes the instructions. The instructions received by the working memory 1235 may optionally be stored on a storage device 1225 either before or after execution by the processor(s) 1210.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium which may be tangible and/or manufactured. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method comprising:
   capturing, by a mobile device, a first image of a series of images;
   obtaining, by the mobile device, based on the first image, a reference template corresponding to a class of targets, the reference template including data representing a first target image, the first target image corresponding to a target to be tracked in the series of images, the target being part of the class of targets;
   identifying, by the mobile device and based on the data representing the first target image of the reference template, a second target image corresponding to the target from the first image or from a second image of the series of images captured by the mobile device;
   determining, by the mobile device, a difference between a first viewing angle for the first target image in the reference template and a second viewing angle for the second target image in the first image or in the second image;
   rectifying, by the mobile device, at least a portion of the first image or at least a portion of the second image based on the difference between the first viewing angle and the second viewing angle to generate a rectified image;
   generating, by the mobile device, a tracking template based on the rectified image;

capturing, by the mobile device, a third image of the series of images; and locating, by the mobile device, the target within the third image using the tracking template.

2. The method of claim 1, further comprising:

transmitting, by the mobile device, at least a portion of the first image to a remote server, wherein the reference template is obtained from the remote server based on the transmitted at least a portion of the first image.

3. The method of claim 1, wherein locating, by the mobile device, the target within the third image comprises:

identifying, from the first image, at least one descriptor; and transmitting, by the mobile device, the at least one descriptor to a remote server, wherein the reference template is obtained from the remote server based on the transmitted at least one descriptor.

4. The method of claim 1, wherein locating, by the mobile device, the target within the third image comprises:

comparing, by the mobile device, at least one descriptor of the tracking template to at least one descriptor of the third image.

5. The method of claim 1, the method further comprising:

presenting, by the mobile device, based on a location of the target within the third image, user-discernable information at least partially based on at least a portion of data linked with the reference template.

6. The method of claim 5, wherein the presenting the user-discernable information comprises presenting the user-discernable information concurrently with the third image.

7. The method of claim 6, wherein the user-discernable information is presented on a display at a location on the display based on a location of the target within the third image.

8. The method of claim 1, further comprising:

cropping, by the mobile device, the rectified image to create the tracking template.

9. A non-transitory computer readable media including instructions that, when executed by one or more processors, cause the one or more processors to:

cause a first image of a series of images to be captured;

obtain, based on the first image, a reference template corresponding to a class of targets, the reference template including data representing a first target image, the first target image corresponding to a target to be tracked in the series of images, the target being part of the class of targets;

identify, using the first target image of the reference template, a second target image corresponding to the target from the first image or from a second image of the series of images;

determine a difference between a first viewing angle for the first target image in the reference template and a second viewing angle for the second target image in the first image or in the second image;

rectify at least a portion of the first image or at least a portion of the second image based on the difference between the first viewing angle and the second viewing angle to generate a rectified image;

generate a tracking template based on the rectified image;

capture a third image of the series of images; and locate the target within the third image using the tracking template.

10. The non-transitory computer readable media of claim 9, further comprising instructions that, when executed by the one or more processors, cause the one or more processors to:

cause at least a portion of the first image to be transmitted to a remote server.

11. The non-transitory computer readable media of claim 9, wherein locating the target within the third image comprises:

identifying, based on the captured third image, at least one descriptor of the target; and causing the at least one descriptor to be transmitted to a remote server.

12. The non-transitory computer readable media of claim 9, wherein locating the target within the third image comprises:

comparing at least one descriptor of the tracking template to at least one descriptor of the third image.

13. The non-transitory computer readable media of claim 9, further comprising instructions that, when executed by the one or more processors, cause the one or more processors to:

present, based on a location of the target within the third image, user-discernable information at least partially based on at least a portion of data linked with the reference template.

14. The non-transitory computer readable media of claim 13, wherein the instructions that, when executed by the one or more processors, cause the one or more processors to cause the user-discernable information to be presented further cause the one or more processors to cause the user-discernable information to be presented concurrently with the third image.

15. The non-transitory computer readable media of claim 14, wherein the instructions that, when executed by the one or more processors, cause the one or more processors to cause the user-discernable information to be presented concurrently with presenting the third image, further cause the one or more processors to:

present the user-discernable information on a display at a location on the display based on a location of the target in the third image.

16. The non-transitory computer readable media of claim 9, further comprising instructions that, when executed by the one or more processors, cause the one or more processors to:

crop the rectified image to create the tracking template.

17. A device configured to track a target within a series of images, the device comprising:

an image capture device; and one or more processors coupled to the image capture device, the one or more processors configured to:

cause a first image of the series of images to be captured by the image capture device;

obtain, based on the first image, a reference template corresponding to a class of targets, wherein the target is included in the class of targets, the reference template including data representing a first target image, the first target image corresponding to a target to be tracked in the series of images, the target being part of the class of targets;

identify, using the first target image of the reference template, a second target image corresponding to the target from the first image or from a second image of the series of images captured by the image capture device;

determine a difference between a first viewing angle for the first target image in the reference template and a second viewing angle for the second target image in the first image or in the second image;

rectify at least a portion of the first image or at least a portion of the second image based on the difference between the first viewing angle and the second viewing angle to generate a rectified image;
generate a tracking template based on the rectified image; and
locate the target within a third image using the tracking template.

18. The device of claim 17, wherein the one or more processors are configured to:
cause at least a portion of the first image to be transmitted to a remote server.

19. The device of claim 17, wherein the one or more processors are configured to:
identify, based on the captured the third image, at least one descriptor of the target; and
cause the at least one descriptor to be transmitted to a remote server.

20. The device of claim 17, wherein the one or more processors are configured to:
compare at least one descriptor of the tracking template to at least one descriptor of the third image.

21. The device of claim 17, further comprising a display; and
wherein the one or more processors are configured to:
cause the display to present, based on a location of the target within the third image, user-discernable information at least partially based on at least a portion of data linked with the reference template.

22. The device of claim 21, wherein the one or more processors are configured to cause the user-discernable information to be presented on the display concurrently with the third image.

23. The device of claim 22, wherein the one or more processors are configured to present the user-discernable information at a location on the display based on a location of the target within the third image.

24. The device of claim 17, wherein the one or more processors are configured to:
crop the rectified image to create the tracking template.

25. The device of claim 17, wherein the device is selected from a group consisting of: a cellular phone, a tablet computer, and a smartphone.

26. An apparatus comprising:
means for capturing a first image of a series of images;
means for obtaining, based on the first image, a reference template corresponding to a class of targets, the reference template including data representing a first target image, the first target image corresponding to a target to be tracked in the series of images, the target being part of the class of targets;
means for identifying, using the first target image of the reference template, a second target image corresponding to the target from the first image or from a second image of the series of images;
means for determining a difference between a first viewing angle for the first target image in the reference template and a second viewing angle for the second target image in the first image or in the second image;
means for rectifying at least a portion of the first image or at least a portion of the second image to generate a rectified image;
means for generating a tracking template based on the rectified image;
means for capturing a third image of the series of images; and
means for locating the target within the third image based on the tracking template.

27. The apparatus of claim 26, further comprising:
means for transmitting at least a portion of the first image to a remote server.

28. The apparatus of claim 26, wherein:
the means for locating the target within the third image comprises:
means for identifying, based on the captured third image, at least one descriptor of the target; and
means for transmitting the at least one descriptor to a remote server.

29. The apparatus of claim 26, wherein:
the means for locating the target within the third image comprises:
means for comparing at least one descriptor of the tracking template to at least one descriptor of the third image.

30. The apparatus of claim 26, further comprising:
means for presenting, based on a location of the target within the third image, user-discernable information at least partially based on at least a portion of data linked with the reference template.

31. The apparatus of claim 30, wherein the means for presenting the user-discernable information comprises means for presenting the user-discernable information concurrently with the third image.

32. The apparatus of claim 31, further comprising:
means for displaying; and
wherein the means for presenting the user-discernable information concurrently with presenting the third image includes causing the means for displaying to present the user-discernable information at a location on the means for displaying based on the location of the target within the third image.

33. The apparatus for tracking the target within the series of images of claim 26, further comprising:
means for cropping the rectified image to create the tracking template.

34. A method comprising:
receiving, by computer system from a mobile device, data representing a first image;
obtaining, by the computer system and based on the data representing the first image, a reference template corresponding to a class of targets, the reference template including data related a first target image, the first target image corresponding to a target to be tracked in a series of images, the target being part of the class of targets;
identifying, by the computer system and based on the data representing the first target image of the reference template, a second target image corresponding to the target from the first image or from a second image received from the mobile device;
determining, by the computer system, a difference between a first viewing angle for the first target image in the reference template and a second viewing angle for the second target image in the first image or in the second image;
rectifying, by the computer system, at least a portion of the first image or at least a portion of the second image to generate a rectified image;
generating, by the computer system, a tracking template based on the rectified image; and
transmitting, by the computer system to the mobile device, the tracking template to enable the mobile device to locate the target in a third image.

35. A non-transitory computer readable media including instructions that, when executed by one or more processors, cause the one or more processors to:
- receive, from a mobile device, data representing a first image;
- obtain, based on the data representing the first image, a reference template corresponding to a class of targets, the reference template including data related a first target image, the first target image corresponding to a target to be tracked in a series of images, the target being part of the class of targets;
- identify, based on the data representing the first target image of the reference template, a second target image corresponding to the target from the first image or from a second image received from the mobile device;
- determine a difference between a first viewing angle for the first target image in the reference template and a second viewing angle for the second target image in the first image or in the second image;
- rectify at least a portion of the first image or at least a portion of the second image to generate a rectified image;
- generate a tracking template based on the rectified image; and
- transmit, to the mobile device, the tracking template to enable the mobile device to locate the target in a third image.

36. A device comprising:
one or more processors configured to:
- receive, from a mobile device, data representing a first image;
- obtain, based on the data representing the first image, a reference template corresponding to a class of targets, the reference template including data related a first target image, the first target image corresponding to a target to be tracked in a series of images, the target being part of the class of targets;
- identify, based on the data representing the first target image of the reference template, a second target image corresponding to the target from the first image or from a second image received from the mobile device;
- determine a difference between a first viewing angle for the first target image in the reference template and a second viewing angle for the second target image in the first image or in the second image;
- rectify at least a portion of the first image or at least a portion of the second image to generate a rectified image;
- generate a tracking template based on the rectified image; and
- transmit, to the mobile device, the tracking template to enable the mobile device to locate the target in a third image.

37. An apparatus comprising:
- means for receiving, from a mobile device, data representing a first image;
- means for obtaining a reference template corresponding to a class of targets, the reference template including data related a first target image, the first target image corresponding to a target to be tracked in a series of images, the target being part of the class of targets;
- means for identifying, based on the data representing the first target image of the reference template, a second target image corresponding to the target from the first image or from a second image received from the mobile device;
- means for determining a difference between a first viewing angle for the first target image in the reference template and a second viewing angle for the second target image in the first image or in the second image;
- means for rectifying at least a portion of the first image or at least a portion of the second image to generate a rectified image;
- means for generating a tracking template based on the rectified image; and
- means for transmitting the tracking template to the mobile device to enable the mobile device to locate the target in a third image.

38. The method of claim 1, further comprising:
in response to locating the target within the third image, presenting, via a display, data linked to the reference template and corresponding to the target.

39. The non-transitory computer readable media of claim 9, further comprising instructions that, when executed by the one or more processors, cause the one or more processors to:
in response to locating the target within the third image, presenting, via a display, data linked to the reference template and corresponding to the target.

40. The device of claim 17, further comprising a display; and
wherein the one or more processors are further configured to:
in response to locating the target within the third image, cause the display to present data linked to the reference template and corresponding to the target.

41. The apparatus of claim 26, further comprising:
means for displaying; and
means for, in response to locating the target within the third image, presenting, via the means for displaying, data linked to the reference template and corresponding to the target.

42. The method of claim 1, wherein the data representing the first image comprise a set of keypoints and descriptors.

43. The method of claim 1, wherein the reference template includes an image of an object not present in the first image.

* * * * *